US008601958B2

(12) United States Patent
Salatino et al.

(10) Patent No.: US 8,601,958 B2
(45) Date of Patent: Dec. 10, 2013

(54) PLANT AND PROCESS FOR THE LOOPING-TYPE COMBUSTION OF SOLID CARBON-CONTAINING FUELS

(75) Inventors: Piero Salatino, Naples (IT); Osvalda Seneca, Naples (IT)

(73) Assignee: Consiglio Nazionale delle Ricerche, Rome (IT)

( * ) Notice: Subject to any disclaimer, the term of this patent is extended or adjusted under 35 U.S.C. 154(b) by 159 days.

(21) Appl. No.: 13/061,862

(22) PCT Filed: Sep. 8, 2009

(86) PCT No.: PCT/EP2009/061636
§ 371 (c)(1),
(2), (4) Date: Mar. 2, 2011

(87) PCT Pub. No.: WO2010/026259
PCT Pub. Date: Mar. 11, 2010

(65) Prior Publication Data
US 2011/0174203 A1 Jul. 21, 2011

(30) Foreign Application Priority Data

Sep. 8, 2008 (IT) .............................. RM2008A0481

(51) Int. Cl.
*F23G 5/00* (2006.01)
(52) U.S. Cl.
USPC ........ 110/245; 423/220; 423/437.1; 422/141; 422/142; 422/144; 422/145

(58) Field of Classification Search
USPC ........ 110/245; 423/220, 437.1; 422/141, 142, 422/144, 145
See application file for complete search history.

(56) References Cited

U.S. PATENT DOCUMENTS

| | | | | |
|---|---|---|---|---|
| 3,980,763 A | * | 9/1976 | Mullhaupt | 423/579 |
| 4,094,817 A | * | 6/1978 | Olson et al. | 502/37 |
| 8,277,736 B2 | * | 10/2012 | Proll et al. | 422/141 |
| 2008/0164443 A1 | * | 7/2008 | White et al. | 252/373 |

OTHER PUBLICATIONS

Zhiyou Du, Adel F. Sarofim, John P. LOngwell, Charles A. Mims, Kinetic Measurement and Modeling of Carbon Oxidation, 1991, Energy & Fuels, 5, 214-221.*

* cited by examiner

*Primary Examiner* — Kenneth Rinehart
*Assistant Examiner* — Gajanan Prabhu
(74) *Attorney, Agent, or Firm* — Gregory P. Einhorn; Gavrilovich, Dodd & Lindsey LLP

(57) ABSTRACT

The invention relates to a plant and a process for the looping-type combustion of solid carbon-containing fuels with a carbon dioxide ($CO_2$) flow output. Said process carries out the conversion of carbon without the help of solid carriers of the $M_yO_x$ type, or of sulphate/sulphide type, and comprises the steps of: (i) Oxidation, wherein the carbon-containing solids are contacted with a gaseous flow comprising oxygen, for a time period and at a temperature sufficient to allow formation of a surface oxidized complex; (ii) Desorption, wherein the surface oxidized complexes generated by adsorption of oxygen in item (i) are released in a gaseous form by decomposition in the absence of $O_2$.

20 Claims, 12 Drawing Sheets

PLANT AND PROCESS FOR THE LOOPING-TYPE COMBUSTION OF SOLID CARBON-CONTAINING FUELS

This application is a national phase patent utility filing under 35 USC §371, for international application no. PCT/EP2009/061636, filed on Sep. 8, 2009, which claims the benefit of priority to Italian patent application serial no. RM 2008 A 000481, filed Sep. 8, 2008. The aforementioned applications are explicitly incorporated herein by reference in their entirety and for all purposes.

FIELD OF THE INVENTION

The invention relates to a plant and a process for the looping-type combustion of solid carbon-containing fuels able to produce a pure carbon dioxide flow without the help of solid oxygen carriers. More specifically, the process carries out the conversion of carbon by the combined use of two reactors in which alternated oxidation and reduction steps are iterated.

PRIOR ART

Combustion processes aimed at thermal or thermoelectric generation based on any carbon-containing fuel inevitably generate carbon dioxide ($CO_2$). The greenhouse effect generated by $CO_2$ and its contribution to the global warming are well known. There is urgent need for re-thinking combustion processes in such a way as to avoid introducing $CO_2$ in the atmosphere, e.g. by way of its storage and confinement in different forms (partially used oil fields, salt waters, sea depths), an operation known as $CO_2$ sequestration.

$CO_2$ sequestration requires that it is preventively concentrated, by separating it from other gaseous components to which it can be combined in combustion effluents. Pure $CO_2$ is compressed and liquefied, and in this state is sent to sequestration. Alternatively, the use of $CO_2$ is hypothesized for the production of compounds of industrial interest, such as methanol, and these uses demand that the $CO_2$ be pure and free from pollutants.

With reference to a general gaseous fuel the stoichiometry of combustion with air is as follows:

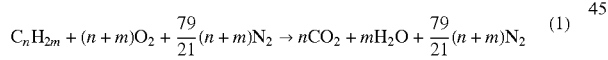

with m, n=positive integers, different from zero.

The $CO_2$ thus produced is not pure as it is present in the combustion effluents in association with steam, nitrogen and excess oxygen. It is therefore necessary to envisage separation and $CO_2$ concentration steps to obtain a pure flow to be sent to sequestration. The $CO_2$ separation and concentration processes currently established are based on the use of ethanolamines and are rather expensive, influencing in a very significant manner the cost of energy (COE) thus produced. Other $CO_2$ separation processes are currently in the development stage. It is therefore necessary to envisage possible variants of the combustion processes which could directly generate flows of pure $CO_2$ thus enabling to get rid of the expensive downstream separation processes. Processes of this kind are called "capture-ready".

As far as a generic gaseous fuel is concerned an answer to this issue is given by the so-called chemical looping combustion processes [1-13]. These processes are based on the combined use of two reactors and of an oxygen "carrier", typically metals/metal oxides of the MO type type (x, y, independently, are positive integers, with y different from zero and x possibly equal to zero), which is cyclically transferred between two reactors.

In the first reactor (air reactor) the oxidation reaction of the carrier by the atmospheric oxygen takes place:

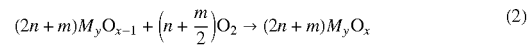

Subsequently, the carrier MO is transferred to the second reactor (fuel reactor) where the reaction:

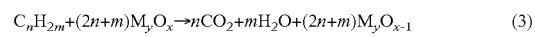

takes place.

The metal in the reduced form, $M_yO_{x-1}$, produced in the reaction (3) is sent back to the air reactor to be re-oxidized according to the reaction (2). All this happens cyclically. The indexes m, n, x and y have the meanings indicated above.

Thanks to this configuration, in the fuel reactor combustion effluents are generated which are made only of $CO_2$ and $H_2O$, without the presence of atmospheric nitrogen and excess oxygen. The $H_2O$ is easily removed by simple condensation. There thus remains a $CO_2$ effluent flow which is virtually pure and which can be compressed and sent to sequestration with no further treatments, or it can either be advantageously used to manufacture secondary raw materials, such as methanol. As it can be seen, this process does not require downstream separation and concentration of $CO_2$, as the produced flow is already virtually pure $CO_2$.

An alternative to the use of metal oxides as oxygen carriers is represented by sulphates which are cyclically exposed to reducing conditions (in the fuel reactor, wherein they are reduced to sulphides), and oxidizing conditions (in the air reactor, wherein they are re-oxidized to the sulphate), shuttling oxygen much like the metal oxide-based oxygen carriers.

Chemical looping combustion was conceived for gaseous fuels. It is easily applied also to liquid fuels, while its extension to solid fuels raises issues as it would need a reaction between components in the fuel reactor both of which are in the solid state, i.e., the carbon C(s) and the metal oxide $M_yO_x$:

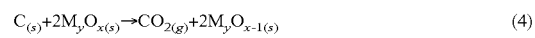

Actually, this reaction implies bringing the reagents into contact in an effective manner, not an easy task. To solve this problem, modified chemical looping processes have been proposed for solid fuels [6-13].

They combine the chemical looping combustion concept with pyrolysis or gasification (dry- and steam-gasification) of the solid fuel. The concept resides in transforming the solid fuel (coal) in a gaseous fuel (CO, $H_2$) by means of the reactions:

coal pyrolysis:

gasification of the solid residue $C_{(s)}$:

The gaseous fuel thus generated then follows the usual pathway of chemical looping combustion, which envisages the reduction reactions of the metal oxide in the gaseous phase:

$$C_nH_{2m}+(2n+m)M_yO_x \rightarrow nCO_2+mH_2O+(2n+m)M_yO_{x-1} \quad (8)$$

$$CO_{(g)}+M_yO_{x(s)} \rightarrow CO_{2(g)}+M_yO_{x-1(s)} \quad (9)$$

$$H_{2(g)}+M_yO_{x(s)} \rightarrow H_2O_{(g)}+M_yO_{x-1(s)} \quad (10)$$

alternating with the metal oxidation reaction:

$$M_yO_{x-1} + \frac{1}{2}O_2 \rightarrow M_yO_x \quad (11)$$

The final result is the same as the one that is obtained with the "classical" chemical looping combustion, but with the need to envisage pyrolysis and gasification steps in addition to chemical looping combustion.

The patent application [13] describes a system wherein the solid fuel is fed to a fluid bed reactor containing the metal oxide $M_yO_x$. The reactor is fluidized with a gas containing $H_2O$ or $CO_2$ so that the reactions (5)-(6)-(7)-(8)-(9)-(10) can take place at the same time. The system, anyway, works in a semi-batch mode since at defined time intervals feeding of the solid fuel must be interrupted and air must be fed in to let the carrier regeneration reaction (11) take place.

Continuous Chemical Looping Combustion processes can be conveniently carried out in plants embodying dual interconnected fluidized beds. For dual interconnected fluid beds to be applicable to looping combustion it is strictly needed that:

proper solids circulation rate and residence time in either reactor can be regulated;

leakage of gas streams from either reactor to the other must be absent.

The application of dual interconnected fluidized beds to cyclic processes is documented in the previous patent literature.

The early concept of coupling exothermic and endothermic chemical reactions in a dual fluidized bed reactor was disclosed in patent [14]. References [15] and [16] disclose the use of interconnected fluidized beds and are pertinent to the technical field of agglomerating gasification of solid fuels, different from the technical field of the present invention. In these patent documents, fuel agglomeration is intentionally promoted in one fluidized bed equipped with burners whence the agglomerated fuel is transported to a second fluidized bed acting as the gasifier.

Patent application [17] discloses a reactor-integrated syphon which is claimed to ensure better control of solids transfer from a downcomer to a high-speed layer through a temporary storage of solids in the bubbling fluidized chamber of the syphon. The design proposed in [17] does not solve the problem of preventing gas leakage from the syphon chamber to the high-speed layer, which is a requisite for applications to looping combustion. In addition, external separation and recirculation of solids from the high-speed layer to the downcomer are not addressed.

SUMMARY OF THE INVENTION

A process which overcomes the issues described above has now been developed, and is the object of the present invention.

The process and the plant that allows to carry it out are described in the claims and in the appended figures.

Further objects of the invention will be apparent from the detailed description of the invention.

BRIEF DESCRIPTION OF THE FIGURES

FIG. 5: Experiment on graphitic coke. Oxidation in the presence of 21% oxygen in nitrogen at 300° C. for about 60 min—desorption in the presence of nitrogen at 600° C. for about 60 min. FIG. 6: Experiment on graphitic coke. Oxidation in the presence of 21% oxygen in nitrogen at 400° C. for about 60 min—desorption in the presence of $CO_2$ at 600° C. for about 60 min. FIG. 7: Experiment on graphitic coke. Oxidation in the presence of 21% oxygen in nitrogen at 400° C.—desorption in the presence of $CO_2$ at 600° C. for about 30 min. FIG. 8: Experiment on graphitic coke. Oxidation in the presence of 21% oxygen in nitrogen at 500° C.—desorption in the presence of $CO_2$ at 700° C. for about 30 min. FIG. 9: Experiment on bituminous coal char. Oxidation in the presence of 21% oxygen in nitrogen at 300° C. for about 60 min—desorption in the presence of nitrogen at 600° C. for about 60 min. FIG. 10: Experiment on bituminous coal char. Oxidation in the presence of 21% oxygen in nitrogen at 300° C. for about 60 min—desorption in the presence of nitrogen at 750° C. for about 60 min.

DETAILED DESCRIPTION OF THE INVENTION

The invention relates to a looping combustion process for solid carbon-containing fuels, also called CarboLoop. With the term "solid carbon-containing fuels" it is meant a wide range of materials such as coals of different quality (from lignite to hard coal), solid residues from oil manufacture (pet-coke, asphaltenes, bitumens), biomasses, solid wastes of different nature, as well as their chars, i.e., all the materials which are solid at room temperature, and which are characterized by having a fixed carbon content >60% and by a high lower heating value (>20 MJ/kg) (ASTM D5865).

The CarboLoop process is based on the observation that carbon-containing solids show, at moderate temperatures, a remarkable affinity for oxygen, fixing it in the form of oxidized surface complexes [18-19]. Such oxides are stable at moderate temperatures but can be removed as CO and $CO_2$ at higher temperatures. The innovative idea underlying the invention is that of using the solid fuel itself as the oxygen carrier, instead of the inorganic vectors (metals/metal oxides $M_yO_x$) used for the traditional processes of chemical looping combustion. This is possible by conveniently alternating the operating oxidation steps (O), which can be expressed with the chemisorption reaction:

$$2C_s + O_2 \rightarrow 2C_s(O) \qquad (12)$$

and with the desorption reaction (D) of the superficial oxides with $CO_2$ production according to the reaction:

$$2C_s(O) \rightarrow CO_2, CO + C_s \qquad (13)$$

In this case the CarboLoop process accomplishes the combustion of the solid carbon producing, in conveniently selected operating conditions, a gaseous flow with an extremely high concentration of $CO_2$ in such a way as to make the whole process "$CO_2$ capture ready".

Figure 1A:
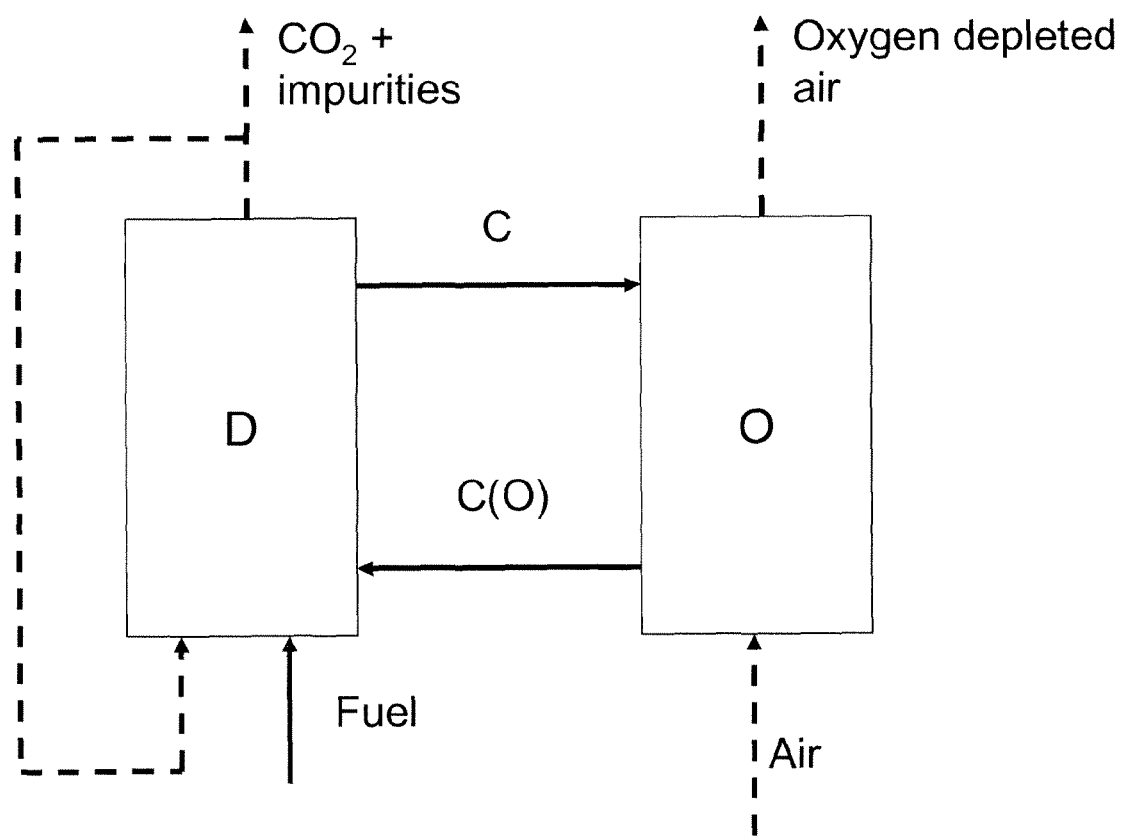
In FIG. 1A the plant for carrying out the CarboLoop combustion is schematically illustrated, wherein the fundamental components are represented by two solid-gas reactors which are connected to each other. The reactor indicated with the letter (O) is the reactor where oxidation takes place. The reactor indicated with the letter (D) is the one where desorption takes place. The dotted lines indicate the gas fluxes, the solid ones the solid fluxes. The reactors (O) and (D) can be based on different types of particle beds, e.g. moving- or fluidized-bed reactors, provided they enable transfer of solids from (O) to (D) and viceversa. In reactor (O) the fuel is exposed to air at a temperature $T_O$ and for a timing to in such a way as to maximize formation of surface oxides. In reactor (D) the fuel is kept in an $O_2$ free atmosphere at the temperature $T_D$ and for a timing to in such a way as to maximize desorption of $CO_2$.
Figure 1B:
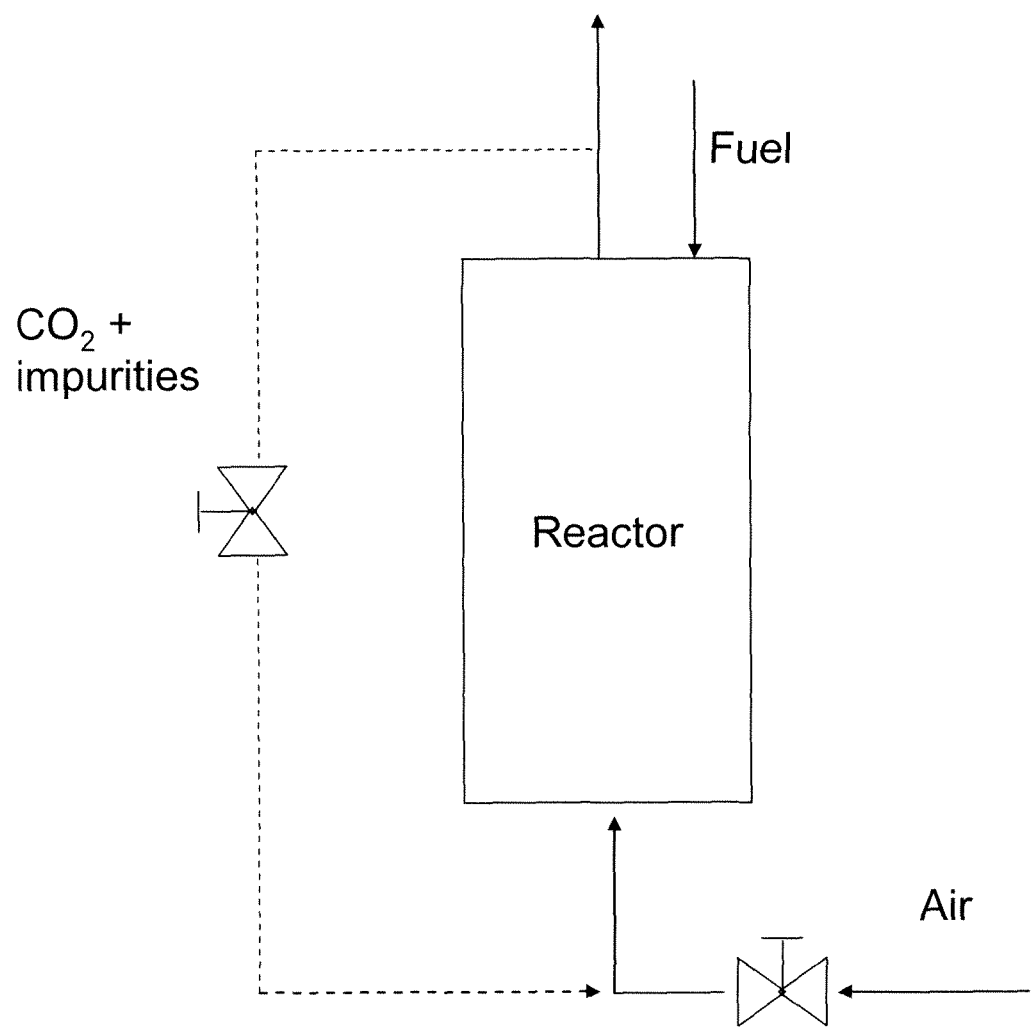
In FIG. 1B the plant for carrying out the CarboLoop process in semi-continuous mode is schematically illustrated. In such a configuration the oxidation and desorption steps are cyclically carried out in the same reactor. The gaseous fluxes which are established during the oxidation step (O) of the cycle are indicated with a solid line, and the gaseous fluxes which are established during the following desorption step (D) are indicated with a dotted line.
Figure 1C:
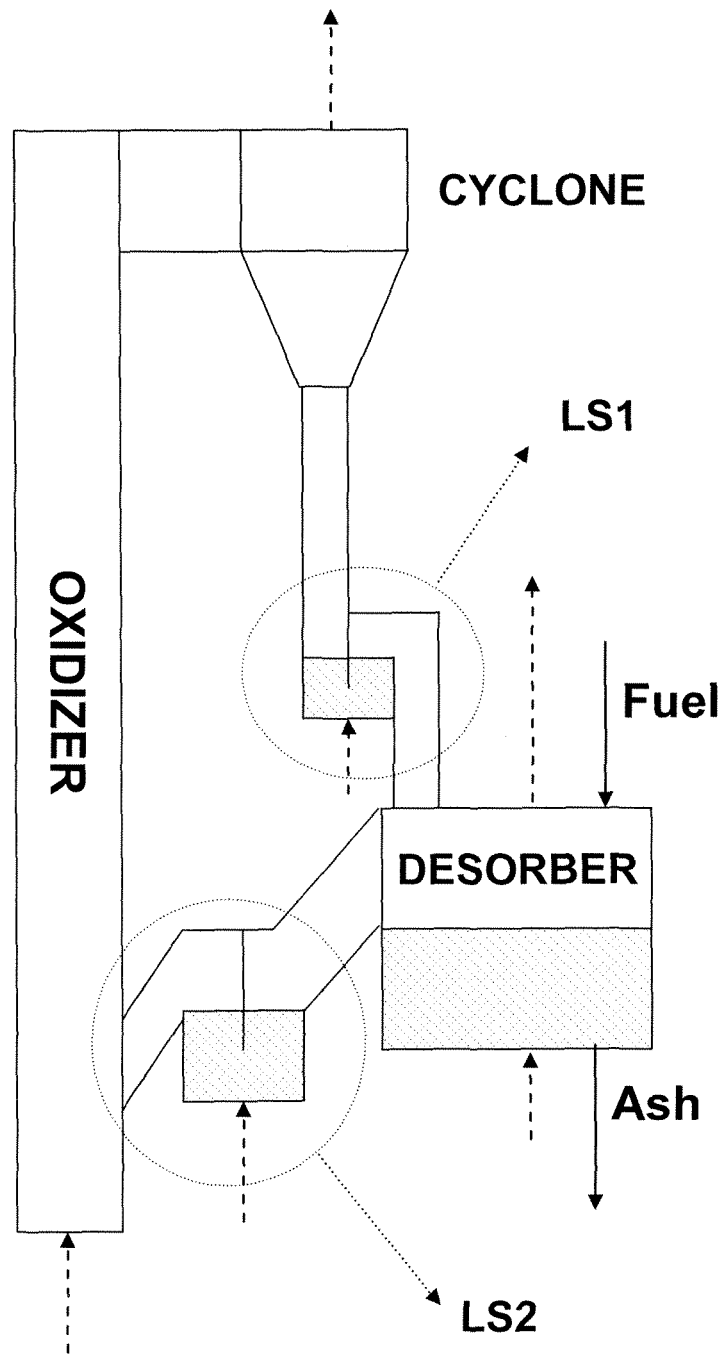
In FIG. 1C a preferred embodiment of the plant for carrying out the CarboLoop process in a continuous mode is schematically illustrated.

The process of the invention can be advantageously carried out with the plants schematically illustrated in FIGS. 1A, 1B and 1C.

In the following, either the oxidation reaction step or the reactor where such a step is carried out will be indicated with (O); in the same way, either the desorption reaction step or the reactor where such a step is carried out will be indicated with (D). From the text it will be apparent whether (O) and/or (D) refer to the reaction or to the reactor.

With respect to the traditional Chemical Looping Combustion which employs carriers of the $M_yO_x$ type, in the CarboLoop process it is necessary to take into account a series of constraints deriving from thermodynamics and from kinetics of the reaction processes which combine to determine the looping combustion of carbon-containing solids.

The fundamental principles of the reaction of a carbon-containing solid with oxygen are known and complex [20-21], as they depend upon many variables, such as, for example, times, temperatures, pressures, partial pressures, grain size, anyway they can be summarized with good approximation by a semi-global reaction mechanism made up of the following three reaction steps:

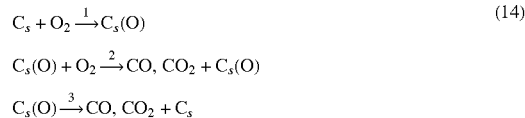

$$C_s + O_2 \xrightarrow{1} C_s(O) \qquad (14)$$

$$C_s(O) + O_2 \xrightarrow{2} CO, CO_2 + C_s(O)$$

$$C_s(O) \xrightarrow{3} CO, CO_2 + C_s$$

step 1: this step corresponds to the chemisorption (chemical adsorption) of oxygen onto the surface of the fuel with formation of an oxidized surface complex;

step 2: this is the reaction with the molecular oxygen of the oxidized surface complex, otherwise known as "complex switch-over", since it generates gaseous combustion products at the same time restoring a new oxidized surface complex;

step 3; this is the desorption reaction of a superficial oxidized complex made up of step 1 and 2 with CO and $CO_2$ production without restoring the superficial oxidized complex.

In the oxidation step (O) the fuel is exposed to air and the chemisorption reaction takes place (step 1). The temperature $T_o$ and the duration of the step (O) must be chosen in such a way as to promote the course of the chemisorption reaction (step 1) and to minimize the switch over (step 2) and desorption (step 3) reactions, which would cause a carbon consumption with production of carbon mono- and di-oxide which at this stage is not desirable. The oxidated complexes which were produced during step (O) will later be released as CO and CO.sub.2 during the desorption step (D) in an oxygen-free atmosphere.

The temperature and the duration of step (D), $T_D$ and $t_D$ respectively, must therefore be chosen so that desorption of the superficial complexes is promoted (step 3) supporting production of $CO_2$ vs. CO. By assuming linear kinetics expressions for oxygen partial pressure in step 1 and 2 and a zero-th order expression for the kinetics of step 3, and by applying the correlations described in [20-21], it is possible to draw a diagram of the representative typical reaction times of each single step $t_I$ (I=1, 2, 3) as a function of temperature and particle size. Such a diagram is reported in FIG. 2 with reference to an oxygen partial pressure of 0.1 bar. In preparing the diagram of FIG. 2 the kinetic resistances associated with mass transfer were taken into account through evaluation of the Sherwood number and of the Thiele modulus, as a function of the carbon particles size.

Figure 2:
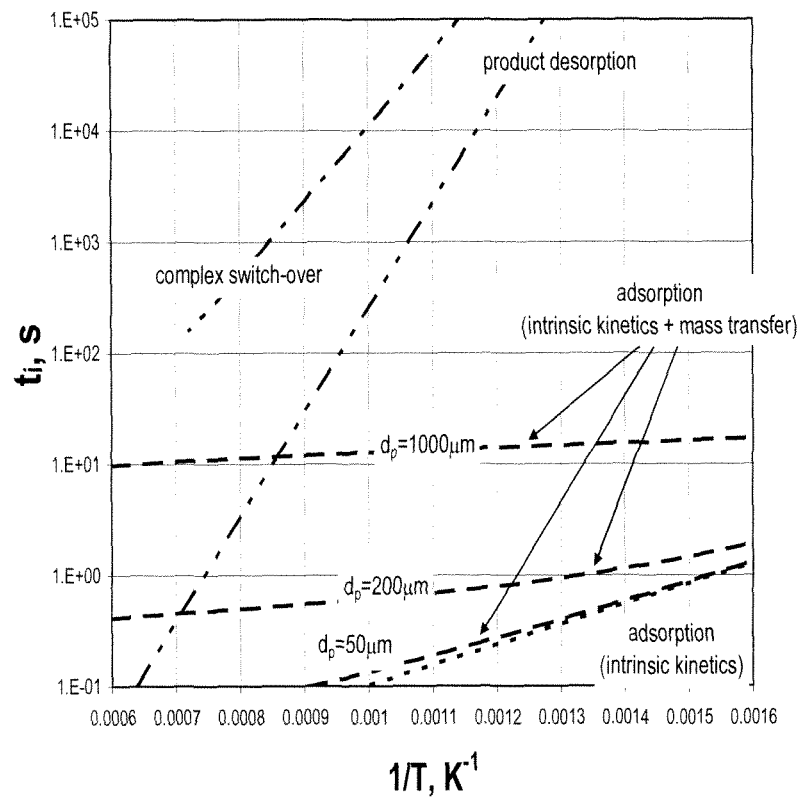
FIG. 2 illustrates a representative diagram of the distinctive timings of the oxidation (chemisorption) and desorption processes which together determine the combustion of carbon-containing fuels.

FIG. 2 is a useful reference map for choosing the operating conditions of reactors (O) and (D). From the analysis of FIG. 2, it can be gathered that the typical timings of step 2, the complex switch-over, are systematically longer than those of step 1 and step 3 in the temperature range of interest. Therefore, the course of step 2 does not significantly influence the course of the reaction of step 1 and step 3. FIG. 2 also suggests that desorption of the oxidized surface complexes (step 3) controls the reaction at medium-low temperature, while chemisorption of oxygen (step 1) controls the reaction at high temperature.

Figure 3:
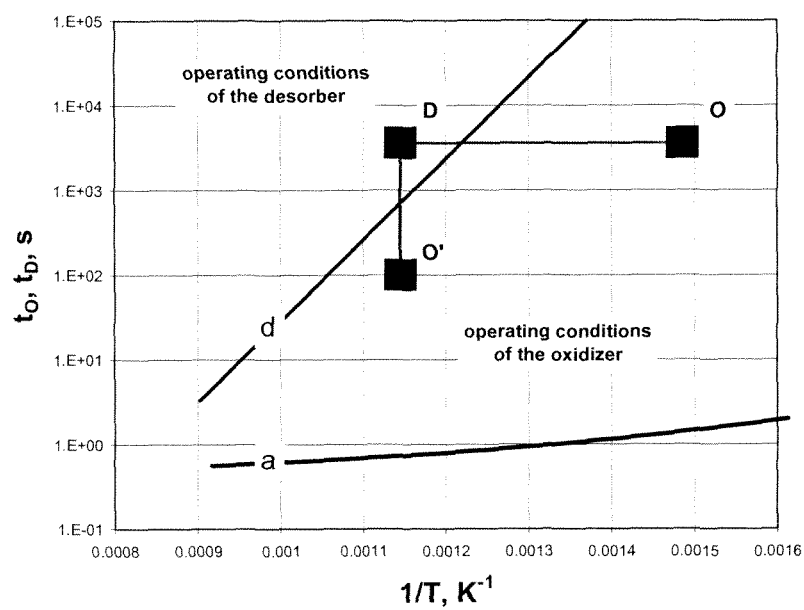
FIG. 3 is a map of the possible operating conditions of the oxidation reactor (oxidizer) (O) and desorption reactor (desorber) (D).

Based on the data of FIG. 2, it is possible to establish the map of possible operating conditions to be adopted during the oxidation (O) and desorption (D) steps, which is better shown in FIG. 3 with reference to fuels with particle size of 200 μm. Points Ox and Ox', placed above the typical adsorption curve (a) and under the typical desorption curve (d), represent, as an example, two of the possible operating conditions for the oxidation step (O), since in these conditions the reaction step 1 takes place, while the course of steps 2 and 3 is minimized.

The point indicated as Des in the same diagram, exemplifies appropriate operating conditions for the desorption step, as in this conditions desorption of oxidized surface complexes is favored according to step 3.

The choice of operating conditions for the oxidation and desorption steps (O) and (D) lends itself to some degree-of-freedom. By way of example, it is possible to carry out steps (O) and (D) at the same temperature ($T_O=T_D$) with different durations ($t_O \neq t_D$): this is the case of the pathway indicated as Ox→Des in FIG. 3, which might be preferred for the continuous operation carried out in the plant of FIG. 1A. Alternatively, it is possible to opt for carrying out the two steps with identical durations ($t_O=t_D$) but with different temperatures ($T_O \neq T_D$): this choice corresponds, for example, to the two points Ox'→Des shown in FIG. 3.

The general rule is, anyway, that the O step must be carried out in operating conditions corresponding to those represented in FIG. 3 by the points found in between the two limit curves (a) and (d).

Such reference conditions are independent from the particle size and from the oxygen partial pressure used during the previous oxidation step.

The constraints which determine the duration to of the oxidation step as a function of the temperature $T_O$ can be approximately represented by the following expressions:

$$t_O > t_{O,MIN} \quad (15)$$

$$t_O < 10^{\left(\frac{9500}{T_O}-8\right)} \quad (16)$$

where $t_O$ is expressed in s and $T_O$ is expressed in K.

In equation (15) $t_{O,MIN}$ indicates a minimum oxidation time, which is function of the size of carbon particles. For carbon particles of size in the range around 200 μm the result is $t_{O,MIN}$=10 s, for carbon particles of 50 μm the result is $t_{O,MIN}$=1 s, for carbon particles of 1 mm the result is $t_{O,MIN}$=100 s. Therefore, $t_{O,MIN}$ is preferably in the range in between 1 and 100 s.

The expressions (15) and (16) establish an upper limit to the possible value for the temperature $T_O$ of the oxidation step. Such a limit corresponds to the intersection between the desorption curve and the adsorption curves illustrated in FIG. 2, which are easily calculated by the person expert in the art.

Figure 4:
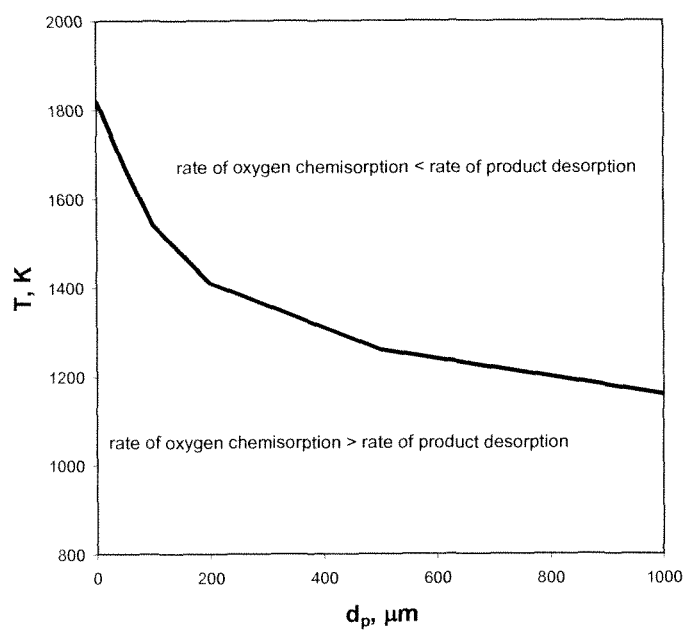
FIG. 4 is a diagrammatic representation of the maximum value of temperature $T_O$ which can be established in the oxidation reactor with a partial pressure of oxygen of $p_{O2}=0.1$ bar, and as a function of the fuel particle size.

The $T_O$ upper limit value, which is a function not only of the particle dimension but also of the oxygen partial pressure in the oxidation step (O), is reported in FIG. 4 in correspondence with an oxygen partial pressure of 0.10 bar and it typically ranges in between 1800 and 1190 K. The person expert in the art can calculate the variability of the operating conditions when the oxygen partial pressure is different from 0.1 bar, in a range that reasonably goes from 0.02 to 0.21 bar.

As far as the conditions that should be established in the desorption step (D) are concerned, step 3 is favored in the conditions illustrated by the points which are above the desorption curve (d) in FIG. 3. It can be said with a good approximation that it exists a temperature threshold below which the main end-product is $CO_2$, and above which the main end-product is CO. For a flow rich in $CO_2$ to be obtained it is needed that the desorption step is carried out at temperatures $T_D$ lower than a threshold value $T_{D,MAX}$ which is dependent on the type of fuel used. $T_{D,MAX}$ is about 1000 K for average quality coals. For fuels of higher quality and with a structure very similar to graphite, $T_{D,MAX}$ takes up higher values (>1200 K).

Values of $T_{D,MAX}$ can easily be determined by means of a laboratory test called "temperature programmed desorption" [22], referred to the specific fuel of interest.

The remarks reported above, which find their expression as a graph in FIG. 3, translate into the following constraints as referred to the operating conditions of the desorption step (D):

$$t_D > 10^{\frac{9500}{T_D}-8}, \text{ wherein } T_D \text{ is expressed in } K \text{ and } t_D \text{ is in } s \quad (17)$$

$$T_D < T_{D,MAX} \quad (18)$$

$T_{D,MAX}$≈1000 K for carbon-containing solids with an amorphous structure,
$T_{D,MAX}$≈1200 K for carbon-containing solids with a more graphite-like structure.

In view of the remarks made above, the CarboLoop process of the invention advantageously comprises the steps of:

(i) Oxidation, wherein the carbon-containing solids are placed in contact with a gaseous flow comprising oxygen, for a time period sufficient to obtain adsorption of $O_2$ onto said solids, according to step 1 of reaction (14);

(ii) Desorption, wherein the superficial oxidized complexes generated by adsorption in step (i) are released in a gaseous form by decomposition in the absence of $O_2$.

Typically, step (i) is carried out at values of oxygen partial pressure which range in between 0.02 and 1 bar, more preferably between 0.05 and 0.21 bar, though lower or higher pressures do not jeopardize the performance of the whole process. Size of carbon-containing solids are preferably in the range 0-1 mm, more preferably 5-700 μm, even more preferably 50-300 μm. The duration of the oxidation step is defined according to the equations (15) and (16), preferably from 1 to 100 s, more preferably from 5 to 50 s. The temperature at which the oxidation step is carried out is typically lower than or equal to 1800 K, preferably 600-1800 K, more preferably 600-1600 K, even more preferably 900-1400 K. A situation where solids are kept moving is advantageous since it would ensure thermal homogeneity within the granular solid. For example, it can be carried out by means of fluidized-bed devices.

Typically, step (ii) is carried out in an $O_2$ free gas, e.g. nitrogen, preferably under a recycling flow coming from the reactor in which the desorption step is carried out (FIGS. 1A and 1B). The size of the carbon-containing fuel particles is substantially the same as the one of step (i). The duration of the desorption step is defined according to expressions (17) and (18), preferably from 1 to 150 min, more preferably from 5 to 30 min. The temperature at which the desorption step is carried out is established based on the temperature programmed desorption test for the specific fuel of interest [22], and it is typically lower than or equal to 1250 K, preferably 700-1250 K, more preferably 800-1200 K. A situation where solids are kept moving is advantageous since it would ensure thermal homogeneity within the granular solid. A flow scheme which envisages a gas flow in counter-flow with respect to the solids is advantageous in terms of yield of the $CO_2$ conversion. An operating condition where a substantial identity of the desorption temperature to the oxidation one can also be advantageous in terms of energetic integration of the oxidation and desorption steps.

The procedures according to which the process can be carried out are of the continuous or semi-continuous type, and can be carried out as diagrammatically represented in FIGS. 1A, 1C and 1B.

As far as the continuous operating plant of FIG. 1A is concerned, it is considered as advantageous to operate in a nearly isothermal system, i.e. with similar temperatures in the oxidation and desorption steps (see the segment Ox'→Des in FIG. 3). Such a condition would suggest to operate with residence times of the carbon solid in the Oxidizer (O) substantially lower than the residence times of the solid in the Desorber (D). A similar configuration can be obtained with the plant configuration illustrated in FIG. 1C. The plant comprises a reactor serving as the Oxidizer preferably of the riser/fluidized-bed type operated in transport or in the fast fluidization regime, characterized by residence times of the solid ranging from 1 to 100 s. The riser is equipped with separation systems of the fluidized solids from the effluent gaseous flow on top, typically made of one or more serial cyclones. The solids coming from the top of the riser are recirculated to a reactor which serves as a Desorber via means ensuring that no leakage or mixing of gases from the riser to the Desorber or vice versa occurs, for example a non-mechanical solids feeding device (LS1) could be used, preferably of loop seal type. Operating the Desorber as a solid bed preferably of fluidized or moving type ensures residence times for the solid which range in between 5 and 150 min. The operating conditions of the Desorber and the geometrical configuration can be defined in such a way that a countercurrent flow of gas and solids is favored as the gaseous stream flows upwards. The re-circulation of solids from the Desorber to the Oxidizer takes place by their transfer from the bottom of the downcomer to the riser through means ensuring that no leakage or mixing of gases from the Desorber to the Oxidize and vice versa occurs, for example a second non-mechanical solids feeding device (LS2) could be used, preferably of loop seal type, equipped with controlled air/fluid flow devices in such a way as to enable the choice of the desired fluidization conditions and of the proper transfer rate of the solids between the reactors. The means ensuring solid recirculation, such as devices LS1 and LS2, are preferably operated with auxiliary streams consisting of $O_2$ free gases (e.g. nitrogen) so as to more effectively prevent any leakage of gas from the Oxidizer to the Desorber and vice versa. Any leakage from the Oxidizer to the Desorber would negatively affect the performance of the plant as it would result in direct combustion of carbon in the Desorber and in the contamination of the pure $CO_2$ stream issuing from the Desorber. Conversely, any leakage from the Desorber to the Oxidizer would negatively affect the performance of the plant as it would result in undesired release of $CO_2$ at the exhaust of the Oxidizer in the atmosphere, which should otherwise be sequestered. Fuel feeding and purge of accumulated ash can be accomplished at different locations in the plant, possibly in either Oxidizer or Desorber.

As far as operation of the semi-continuous plant of FIG. 1B is concerned, it is possible to operate the process cyclically, both with substantially identical oxidation and desorption times (see segment Ox→Des in FIG. 3) and in isothermal conditions (see segment Ox'→Des in FIG. 3). Alternation of exposure of the fuel particles to Oxidation and Desorption steps is accomplished in this case in the same reactor, with the advantage that no transfer of solids between different reactors has to be accomplished.

The plant of FIG. 1B substantially consists of only one reactor, preferably with a fixed or fluidized bed, the latter operated in a captive regime (i.e., operated in conditions where the fluidized bed is not dragged away by the fluidizing gas). The reactor is equipped with devices for feeding at the bottom a gaseous flow which may be oxygen-based (in the O stage) or recycled $CO_2$ (in the D stage of the cycle). Feeding of the carbon-containing fuel to the reactor takes place by gravity on top of the fluidized bed by means of hoppers and devices which meter and control the feeding rate of the fuel.

The CarboLoop process according to the invention obtains the same results as the Chemical Looping Combustion of solids, but with remarkable innovations and the following process and plant advantages:

- It is not necessary to preliminarily gasify the carbon-based solid fuel into a combustible gas, as required by the traditional processes of Chemical Looping Combustion.
- It is not necessary to have an external carrier like a metal/metal oxide $M_yO_x$ or a sulphate/sulphide. Actually, the oxygen carrier is the carbon that is present in the fuel itself. This implies that it is not necessary to have metal oxides or sulphates as auxiliary reagents, furthermore it is not necessary to use steam to pre-treat the solid fuel (steam gasification).
- The CarboLoop process is inherently exempt from problems caused by inefficient gas-solid contact in the Desorber. Any inefficiency in gas-solid contact arising in the Fuel Reactor of conventional Chemical looping combustors results in loss of unconverted fuel at the exhaust and requires additional downstream processing of the effluents (e.g. oxygen polishing) prior to $CO_2$ sequestration. On the contrary, the Desorber in the CarboLoop process according to the invention simply serves to the function of enabling thermal decomposition of surface oxides, and is therefore not affected by the efficiency of gas-solid contact.
- The process can be carried out at lower temperatures and with smaller reaction volumes.
- Complex systems are not needed to separate the ashes coming from the fuel combustion, which are to be disposed of, or to be separately treated from the carrier which must be continuously re-cycled.
- It is clear that the CarboLoop process is extremely simpler with respect to other Chemical Looping Combustion processes, it allows a significant energy saving, it is more convenient both in terms of amortization and in terms of operating cost, it has a lower impact on environment.

What follows should be considered by way of example and not as limiting the breadth of the invention.

EXAMPLE

The CarboLoop process was tested by means of experiments of the discontinuous type during which oxidation/desorption cycles were alternating in conditions which were representative of a Chemical Looping Combustion. These were carried out in a thermogravimetric scale Netzsch 409C coupled to an IR analyzer for $CO/CO_2$ (HB URAS 3E).

The experiments were carried out on samples of two different carbonaceous solids: a graphitic coke and a char obtained from a bituminous coal. The latter was obtained by pyrolysing the raw coal at 900° C. for 1 min in a fluidized bed reactor. Both samples had particle size below 200 µm. It must be noted that the first sample is not by itself an interesting fuel from the applicative point of view, but it constitutes a good "surrogate" to represent the behaviour of poorly reacting fuel. On the contrary the second one is representative of a typical fuel with average reactivity. For each test 30 mg of sample were used.

The Chemical Looping Combustion tests were carried out according to the following procedure:

Step (a) (sample heating and oxidation). The sample is charged in TGA and is heated in a (200 ml/min) flow of nitrogen and 21% oxygen to the desired oxidation temperature $T_O$ at a heating rate of 50° C./min. The sample is then exposed to an air flow for a time interval to.

Step (b) (desorption). A flow of $O_2$ free gas (nitrogen of chromatography grade or $CO_2$) is fed in and at the same time the temperature of the TGA is brought to the desired value for desorption, $T_D$, at a rate of 50° C./min. The sample is then left in an $O_2$ free gas flow for a time interval of duration $t_D$, before bringing down the temperature and starting with a new oxidation cycle.

Step (c) (oxidation). Once the oxidation temperature $T_O$ is achieved, nitrogen and 21% oxygen is fed in again and the sample is oxidized for a time interval of duration to.

Steps (b) and (c) were repeated a number of times. During the experiments, loss of weight and concentration of the chemical species $CO/CO_2$ was monitored at the exit by means of the IR analyzer.

Figure 5:
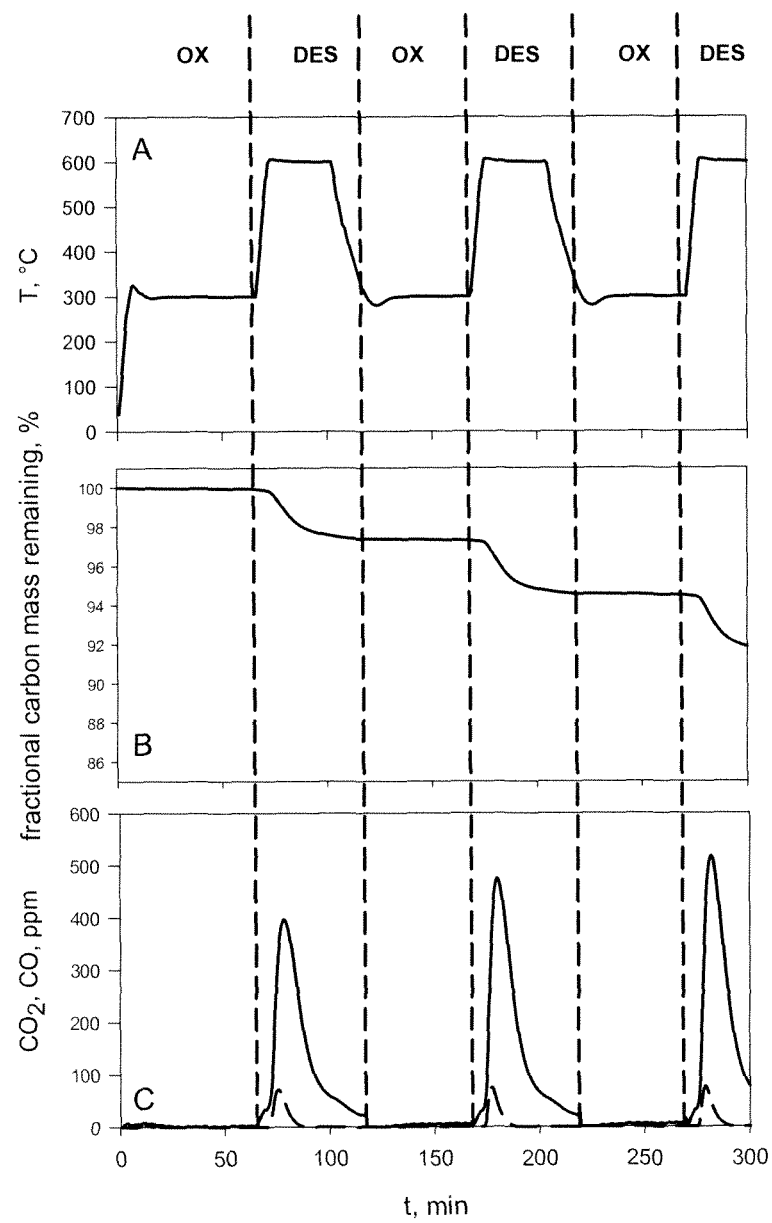
FIGS. 5-10 illustrate the results of combustion experiments according to the CarboLoop process which were simulated in a thermogravimetric analyzer at different operating conditions during three oxidation-desorption cycles for two carbonaceous materials. (A) Time series of the sample temperature; (B) Time series of the residual fractional carbon mass in the sample; (C) Time series of the CO and $CO_2$ concentrations in the gaseous effluent from the reactor. Alternating conditions for oxidation and desorption were established as follows.

FIG. 5 shows the results of an experiment consisting in the application of the CarboLoop process to samples of graphitic coke. Only three cycles are reported, but the observed behaviour presented itself in a very similar way for many further cycles. FIG. 5 shows:

The time course of the temperature, cyclically changing in between 300 and 600° C.

The time course of the CO—$CO_2$ concentration found in the gases at the exit by means of the IR analyzer.

The reduction of the carbon mass in the sample during the time course, as results from processing of the CO and $CO_2$ outputs released by the sample during the test.

In addition, in FIG. 5 the instants at which the alternance between oxidation conditions (exposition to air) and desorption conditions (exposition to nitrogen) are marked.

In FIG. 5 it is shown that, as foreseen, during the oxidation step the CO and $CO_2$ release is negligible, since in the selected conditions the desorption reaction does not take place in a significant way. The sample shows a marked tendency to chemically absorb oxygen even after a number of cycles. The chemically absorbed oxygen is released during the desorption steps mainly as $CO_2$ and in a very smaller quantity as CO. By varying the operating conditions it is possible both to increase the CO production at the expense of $CO_2$, and, alternatively, to actually make the CO production negligible with respect to the $CO_2$ one. This can be done by conveniently introducing changes in the temperature at the desorption step $T_D$. The limiting condition to make the CO presence negligible is represented by the condition $T_D = T_{D,MAX}$.

In the experiment shown in FIG. 5, where $T_O = 300°$ C. and $T_D = 600°$ C., in three desorption cycles (i.e., for 120 min of desorption at 600° C. in the whole) a carbon conversion of 10% was obtained corresponding to an average combustion rate $$R_c = 8 \cdot 10^{-4} \frac{g_C}{g_C \cdot \min}.$$

Figure 6:
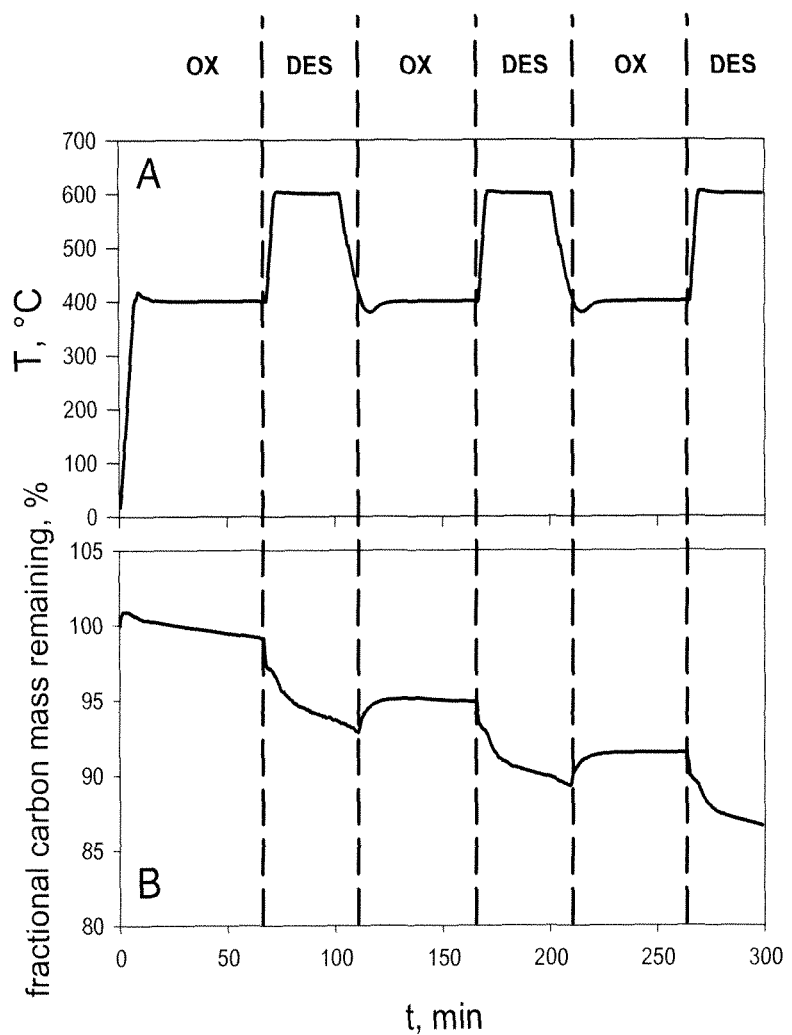
Figure 7:
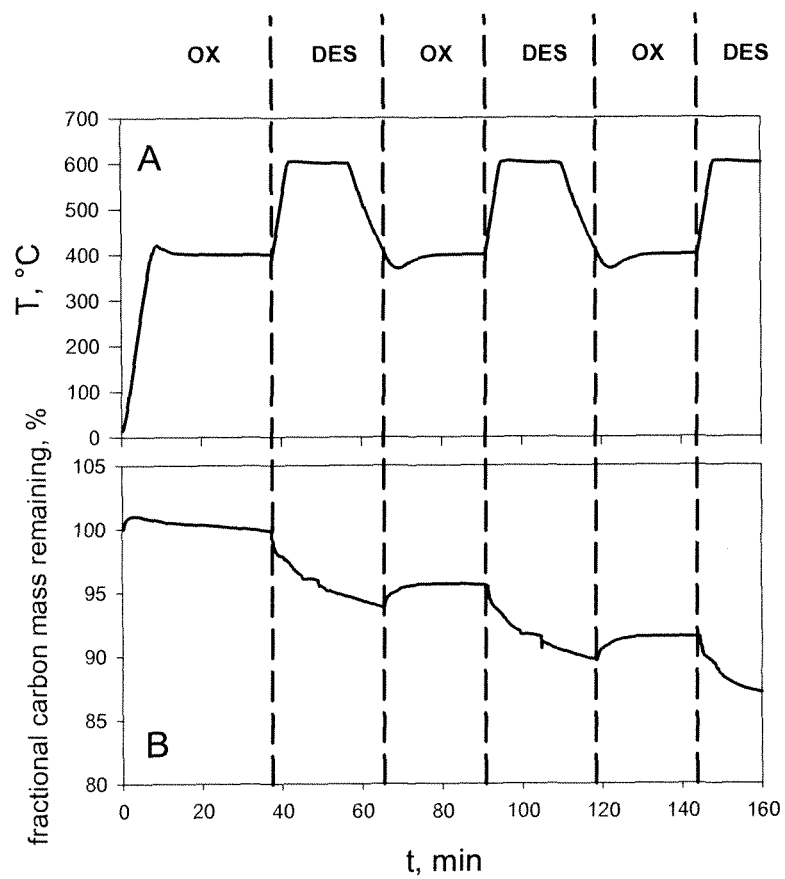
Figure 8:
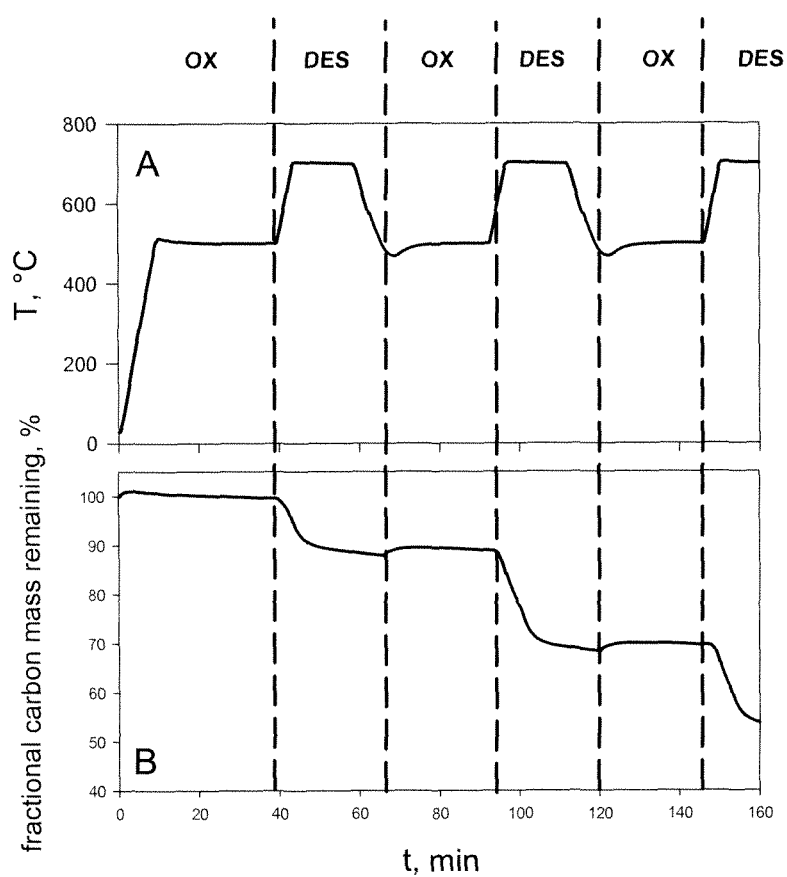

FIGS. 6-8 show the results of other simulation tests of looping combustion of graphitic coke in a thermogravimetric analyzer. These tests, differently from the ones whose results are shown in FIG. 5, were carried out using $CO_2$ instead of nitrogen as the inert gas to flux the sample in the desorption step. The operating conditions adopted for these tests were selected considering the following parameters for cycles (O) and (D):

$t_O$=30 and 60 min
$t_D$=30 and 60 min
$T_O$=400 and 500° C.
$T_D$=600 and 700° C.

The graphs in FIGS. 6-8 show:
the increase in weight of the sample during the oxidation steps which is associated with the chemical absorption of oxygen;
the decrease in weight following desorption during the phases of exposition to an $O_2$ free atmosphere and to medium-high temperatures $T_D$.

The conversion rates of carbon calculated as averages during the whole conversion cycle show maximum values in the range of $$R_c = 1 \cdot 10^{-2} \frac{g_C}{g_C \cdot \min}.$$

These data, although only indicative, allow to evaluate the conversion of a carbon fuel with a reactivity comparable to the one of graphitic coke (and for this reason particularly low) by means of the CarboLoop process. The latter could be carried out using a specific carbon loading of about 200 kgC/$MW_{th}$, which might be reduced as a consequence of an optimized choice of the operating conditions during oxidation and desorption.

Figure 9:
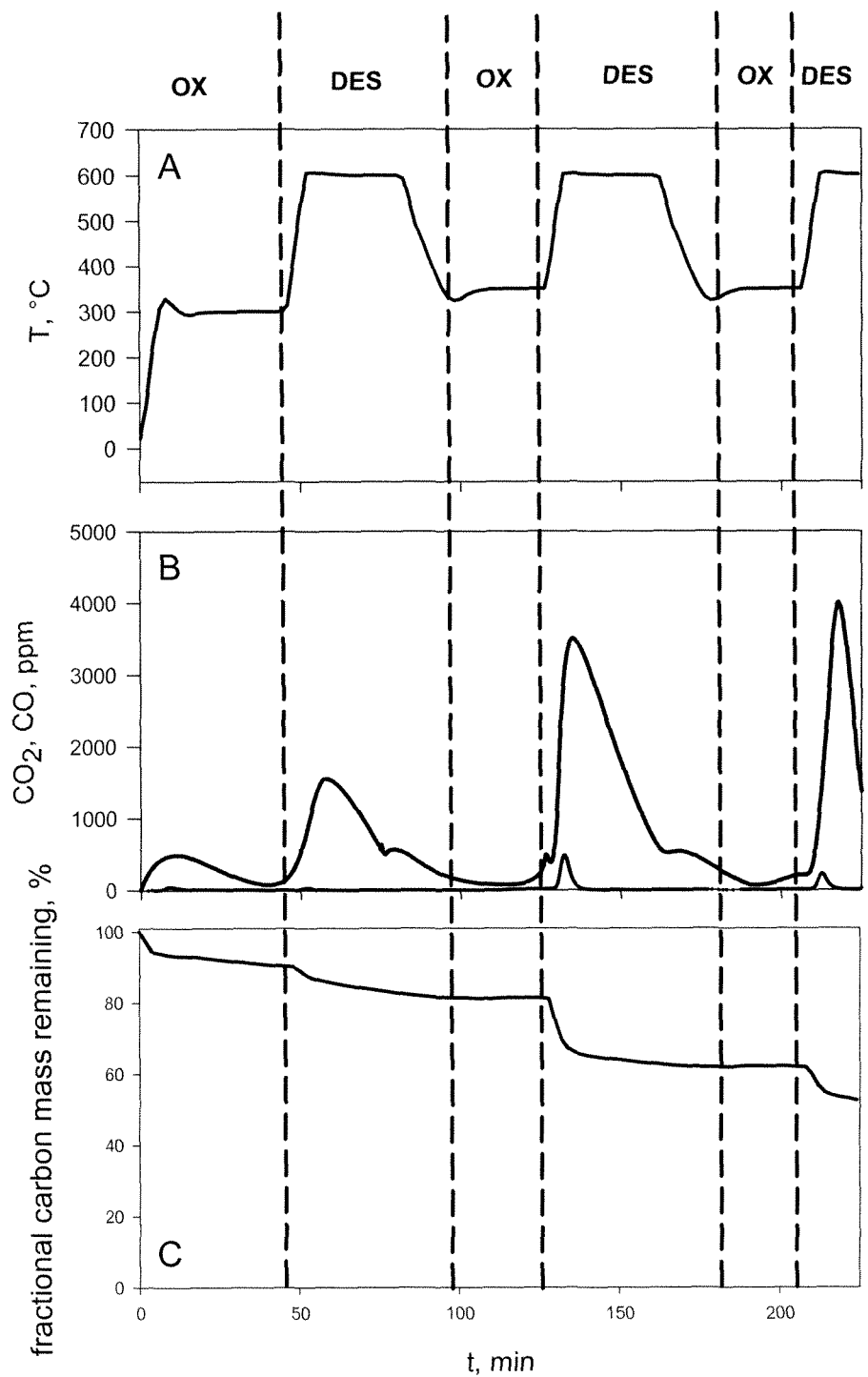
Figure 10:
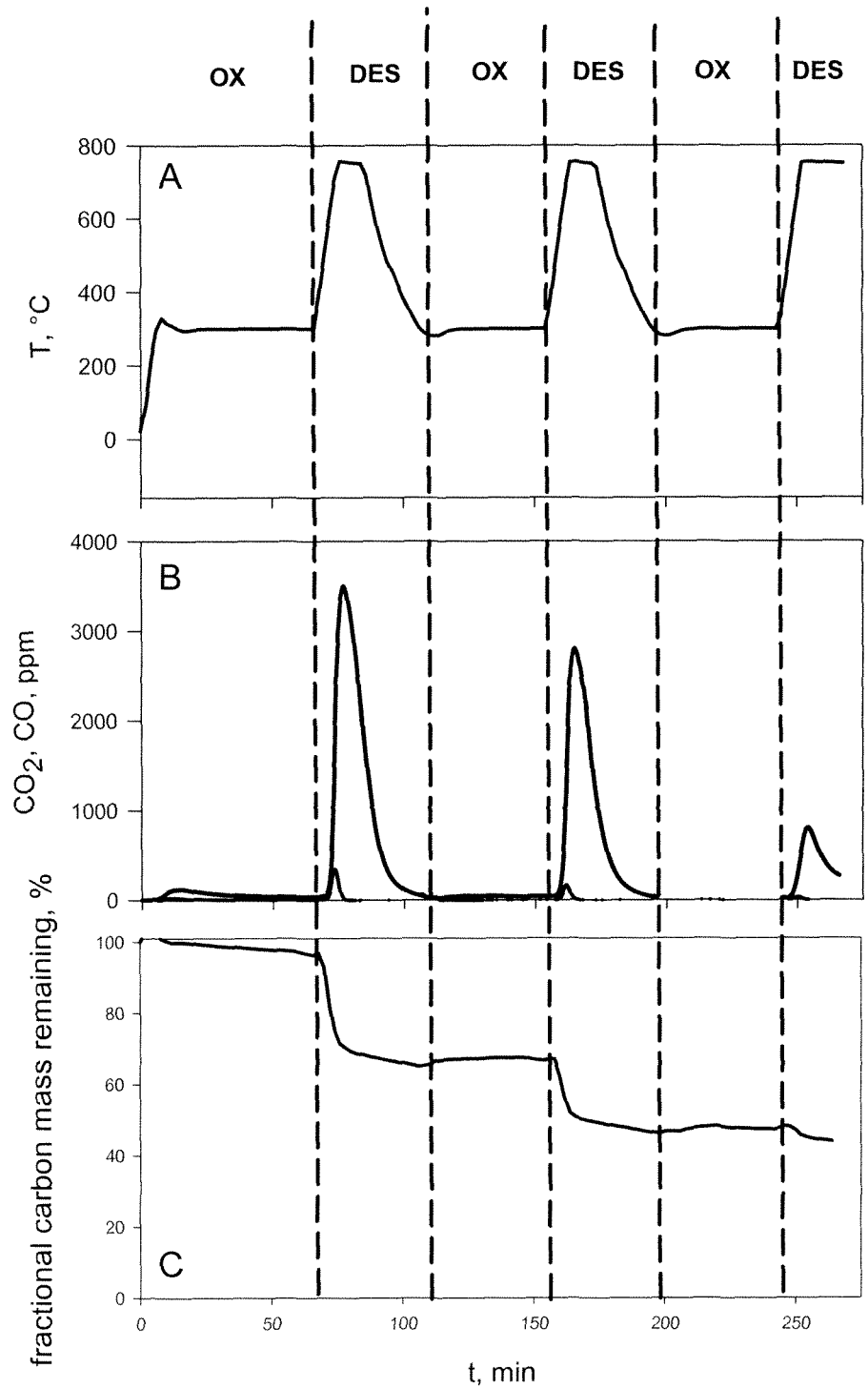

FIGS. 9 and 10 show the results of experiments consisting in the application of the CarboLoop process to sample of bituminous coal char for the following operating conditions for cycles (O) and (D):

$t_O$=60 min
$t_D$=60 min
$T_O$=300° C.
$T_D$=600 and 750° C.

In FIGS. 9-10 it is shown that, also for the char from a bituminous coal, as already seen for the graphitic coke, very modest weight loss and release of CO and $CO_2$ take place during the oxidation steps. The oxygen chemically absorbed during the oxidation steps is released during the desorption steps mainly as $CO_2$ and in a much smaller quantity as CO. The weight loss observed during the desorption cycles is higher for the bituminous coal char than for graphitic coke: a carbon conversion of 48 and 56% are obtained in three cycles of the CarboLoop process with desorption temperature of 600 and 750° C. respectively. The conversion rates of carbon calculated as averages during the whole conversion cycle show maximum values in the range of $$R_c = 5 \cdot 10^{-2} \frac{g_C}{g_C \cdot \min}.$$

Accordingly, conversion of a carbon fuel with a reactivity comparable the one of the bituminous coal char could be accomplished by means of the CarboLoop process using a specific carbon loading of about 40 kgC/$MW_{th}$, which might be further reduced by optimizing the choice of the operating conditions during oxidation and desorption.

REFERENCES

1. A. Lyngfelt, B. Leckner, T. Mattisson, *Chem. Eng. Sci.* 56 (10) (2001) 3101-3113.
2. H. Jin, M. Ishida, *Fuel* 83 (17) (2004) 2411-2417.
3. T. Mattisson, F. Garcia-Labiano, B. Kronberger, A. Lyngfelt, J. Adanez, H. Hofbauer, *Int. J. Greenhouse Gas Control* 1 (2007) 158-169
4. E. Johansson, A. Lyngfelt, T. Mattisson, F. Johnsson, *Powder Technology*, 134 (3) (2003) 210-217.

5. R. K. Lyon, J. A. Cole, *Combust. Flame* 121 (½) (2000) 249-261
6. J. S. Dennis, S. A. Scott, A. N. Hayhurst, *J. Energy Inst.* 79 (3) (2006) 187-190.
7. H. Leion, T. Mattisson, A. Lyngfelt, *Fuel* 86 (2007) 1947-1958.
8. W. P. Pan, Y. Cao, K. Liu, W. Wu, J. T. Riley, *Application of a circulating fluidized-bed process for the chemical looping combustion of solid fuels*. Abstracts of Papers, 228th ACS National Meeting, Philadelphia, Pa., United States, Aug. 22-26, 2004:p. Fuel-155.
9. Y. Cao, Z. Chen, J. T. Riley, W. P. Pan, *Reduction of solid oxygen carrier (CuO) by solid fuel (coal) in chemical looping combustion*. Abstracts of Papers, 229th ACS National Meeting, San Diego, Calif., United States, Mar. 13-17, 2005:p. Fuel-044.
10. J. Wang, E. J. Anthony, *Applied Energy* 85 (2) (2008) 73-79.
11. M. Ishida, H. Jin, Chemical-Looping *Combustion Power Generation Plant System*; U.S. Pat. No. 5,447,024;
12. T. J. Thomas, L.-S. Fan, P. Gupta, L. G. Velasquez-Varga; "*Combustion looping using composite oxygen carrier*"; United States Patent appl. No. US 2005/0175533 A1;
13. J. Dennis, A. Hayhurst, S. Scott, Solid Fuel Combustion Method and Apparatus; International Patent Appl. No. WO 2007/107730 A1 PCT/GB2007/000961.
14. U.S. Pat. No. 4,076,796
15. EP 0 348 454 A2
16. U.S. Pat. No. 4,684,375
17. WO 2007/023590 A1
18. O. Senneca, P. Salatino, S. Masi, *Proc Comb Inst* 30 (2005) 2223-30.
19. O. Senneca, P. Salatino, D. Menghini, *Proc. Comb. Inst.* 31 (2007) 1889-1995.
20. R. H. Hurt, J. M. Cabo, *Combust. Flame* 125 (3) (2001) 1138-1149.
21. S, Niksa, G.-S. Liu, R. H. Hurt, *Progr. Energy Combust. Sci.* 29 (5) (2003) 425-477.
22. Z. Du, A. F. Sarofim, J. P. Longwell, *Energy & Fuels* 5 (1991) 214-221.

The invention claimed is:
1. A process for the combustion of carbon-containing solids with production of carbon dioxide,
wherein the carbon conversion is carried out without the aid of a metal, sulphate or sulphide oxygen carrier or a carrier of the $M_yO_x$ type, with y and x being positive integer with y different from 0 and x which may also be 0 independently from each other,
and the process comprises use of an oxidizing fluid bed reactor and a desorption tank operatively interconnected,
said process comprising:
(a) providing a fuel comprising a fluidized carbon-containing solid;
(b) providing an oxidizing fluid bed reactor designed to flow a gas from the bottom to the top of the oxidizing fluid bed reactor, having:
  (i) a input source for a gaseous flow, wherein the gas comprises an oxygen in the form comprising $H_2O$ and $CO_2$, or $H_2O$ or $CO_2$;
  (ii) a fluidized fuel input from the desorption tank or another source,
  (iii) an output connection to the desorption tank for moving an oxidized fluidized carbon-containing solid; and
  (iii) an outlet for $CO_2$ gas and impurities;
(c) a desorption tank having:
  (i) a fluidized fuel input,
  (ii) an input connection from the oxidizing fluid bed reactor for taking in an oxidized fluidized carbon-containing solid,
  (iii) an output connection to the oxidizing fluid bed reactor for moving a post-combustion fuel to the oxidizing fluid bed reactor; and
  (iv) an outlet for $CO_2$ gas and impurities;
(d) oxidating the carbon-containing solid with the gas comprising $H_2O$ and $CO_2$, or $H_2O$ or $CO_2$,
wherein the carbon-containing solids are placed in contact with the gaseous flow comprising the oxygen, for a time period and at a temperature sufficient to allow formation of a superficial oxidized complex of carbon-containing solid,
wherein the duration of the oxidation is defined according to the expressions:

$$t_o > t_{o,MIN}$$

$$t_o < 10^{[(9500/T_o)-8]}$$

where $t_o$ is expressed in s and $T_o$ is expressed in K,
and temperatures are low enough to avoid carbon consumption and associated release of $CO_2$, but sufficient for oxygen to be uptaken by the fluidized carbon-containing solid,
after the oxidizing passing the superficial oxidized complex of carbon-containing solid to the desorption tank; and
(e) desorpting or combusting the oxidated carbon-containing solid in the absence of $O_2$, wherein the superficial oxidized complexes generated by adsorption of the oxygen in step (d) are released in a gaseous form by a decomposition or combustion in the absence of $O_2$,
wherein the duration of the desorption step (d) is defined according to the expressions:

$$t_D < 10^{[(9500/TD)-8]},$$

with $T_D$ expressed in K and $t_D$ in s $$T_D < T_{D,max}$$

where $t_D$ ranges are in between about 1 and 150 min, $T_D$ equal or lower than about 1250K.

2. The process of claim 1, wherein the oxidating step (d) is carried out in the presence of air at a partial pressure ranging between about 0.02 and 1 bar, or between about 0.05 and 0.21 bar.

3. The process of claim 1, wherein the carbon-containing solids have grain sizes in the range in the interval of between about 0-1 mm, or between about 5-700 µm, or between about 50-300 µm.

4. The process of claim 1, where
where $t_{o,MIN}$=10 s (seconds) for carbon-containing particles of grain size of about 200 µm, $t_{o,MIN}$=1 s for particles of 50 µm, $t_{o,MIN}$=100 s for particles of 1 mm, respectively,
or $t_o$-ranging in between about 1 and 100 s,
or in between 5 and 50 s,
or $T_o$ equal or lower than 1800 K at a pressure of 0.1 bar,
or ranging between about 600-1800K,
or ranging between about 800-1600K, or between about 900-1400K.

5. The process of claim 1, wherein the desorpting or combusting step is carried out in the presence of an $O_2$ free gas, or nitrogen.

6. The process of claim 1, wherein the duration of the desorption step is in between about 5 and 30 min with the temperature in between about 700-1250K, or ranging in between about 800-1200K.

7. The process of claim 1, wherein a gaseous stream is fed to the desorption tank in step (e) in countercurrent flow with respect to the solids.

8. The process of claim 1, wherein the oxidation and desorption steps are carried out at desorption and oxidation temperatures which are substantially identical to each other.

9. A plant for carrying out in a continuous manner the process of claim 1, wherein the plant comprises:
    a first reactor, acting as Oxidizer, optionally of the riser/fluidized-bed type operated in the transport or in the fast fluidization regime; and
    a second reactor functioning as Desorber, optionally of fluidized or moving bed type, operating in counter-flow;
    wherein the Desorber and the Oxidizer being doubly interconnected with each other and interconnected to allow re-circulation of solids from the Desorber to the Oxidizer and vice versa but prevent leakage and mixing of the gaseous flows between the two reactors.

10. The plant according to claim 9 wherein the Oxidizer is further equipped with systems on its top for separating the fluidized solid contained in gaseous effluents, optionally comprising one or more serial cyclones.

11. The plant of claim 9, wherein the Desorber is further equipped with a non-mechanical valve, optionally of the loop seal type (LS1), supplied by $O_2$ free gas for controlled aeration or fluidization, for feeding back the solids coming from the top of the Oxidizer to the Desorber.

12. The plant of claim 9, wherein the recirculation of the solids from the Desorber to the Oxidizer is carried out by feeding them from the bottom of the downcomer to the riser through a non-mechanical valve, optionally of the loop seal type (LS2), supplied by $O_2$ free gas for controlled aeration or fluidization.

13. A plant for carrying out the process of claim 1 in a semi-continuous manner wherein the plant comprises a single reactor which cyclically acts both as Oxidizer and Desorber in order to prevent the mixing of the gaseous streams with which the fuel is contacted during the Oxidation and the Desorption steps.

14. The plant according to claim 13 wherein the reactor is of the fixed or fluidized bed type and additionally provided with a bottom-feeding system for the gaseous flow and with systems for feeding the carbon-containing solids used as a fuel by gravity on top of the reactor, optionally using hoppers and devices for metering the feeding rate of the fuel.

15. A process for the combustion of carbon-containing solids with production of carbon dioxide, wherein the carbon conversion is carried out without the aid of solid oxygen carriers of the $M_yO_x$ type, with y and x being positive integer with y different from 0 and x which may also be 0 independently from each other, or of sulphate/sulphide type, said process being carried out in a continuous manner and comprising:
    (i) Oxidation, carried out in a reactor (O), wherein the carbon-containing solids are placed in contact with a gaseous flow comprising oxygen, for a time period and at a temperature sufficient to allow formation of a surface oxidized complex; and
    (ii) Desorption, carried out in a reactor (D), wherein the surface oxidized complexes generated by adsorption of oxygen in item (i) are released in a gaseous form by decomposition in the absence of $O_2$;
    reactor (O) and reactor (D) being doubly interconnected with each other and provided with means, optionally non-mechanical valves for transfer of solids from the Oxidizer to the Desorber and vice versa, optionally of the loop seal type (LS1, LS2), that prevent the leakage and mixing of the gaseous flow towards and from said reactors, optionally supplied with $O_2$ free gas,
    and wherein the duration of the oxidation step is defined according to the expressions:

$$t_o > t_{o,MIN} \quad (15)$$

$$t_o < 10^{[(9500/T_o)-8]} \quad (16)$$

where $t_o$ is expressed in s and $T_o$ is expressed in K and where $t_{o,MIN}$=10 s (seconds) for carbon-containing particles of grain size of about 200 μm, $t_{o,MIN}$=1 s for particles of 50 μm, $t_{o,MIN}$=100 s for particles of 1 mm, respectively,
or $t_o$ ranging in between about 1 and 100 s, or in between 5 and 50 s, or $T_o$ equal or lower than 1800 K at a pressure of 0.1 bar, or ranging between about 600-1800K, or ranging between about 800-1600K, or between about 900-1400K.

16. A process for the combustion of carbon-containing solids with production of carbon dioxide, wherein the carbon conversion is carried out without the aid of solid oxygen carriers of the $M_yO_x$ type, with y and x being positive integer with y different from 0 and x which may also be 0 independently from each other, or of sulphate/sulphide type,
    said process being carried out in a semi-continuous manner in a single reactor which acts cyclically and alternately as an oxidizer or a desorber, said process comprising:
    (i) Oxidation, carried out in an oxidizer (O), wherein the carbon-containing solids are placed in contact with a gaseous flow comprising oxygen, for a time period and at a temperature sufficient to allow formation of an oxidized surface complex; and
    (ii) Desorption, carried out in a desorber (D), wherein the oxidized surface complexes generated by adsorption of oxygen in item (i) are released in a gaseous form by decomposition in the absence of $O_2$;
    said cyclic and alternate steps in a single reactor preventing the mixing of the gaseous flows with which the fuel is contacted during the oxidation and the desorption steps
    and wherein the duration of the oxidation step is defined according to the expressions:

$$t_o > t_{o,MIN} \quad (15)$$

$$t_o < 10^{[(9500/T_o)-8]} \quad (16)$$

where $t_o$ is expressed in s and $T_o$ is expressed in K and where $t_{o,MIN}$=10 s (seconds) for carbon-containing particles of grain size of about 200 μm, $t_{o,MIN}$=1 s for particles of 50 μm, $t_{o,MIN}$=100 s for particles of 1 mm, respectively,
or $t_o$ ranging in between about 1 and 100 s, or in between 5 and 50 s, or $T_o$ equal or lower than 1800 K at a pressure of 0.1 bar, or ranging between about 600-1800K, or ranging between about 800-1600K, or between about 900-1400K.

17. A process for the combustion of carbon-containing solids with production of carbon dioxide, wherein the carbon conversion is carried out without the aid of solid oxygen carriers of the $M_yO_x$ type, with y and x being positive integer with y different from 0 and x which may also be 0 independently from each other, or of sulphate/sulphide type, said process comprising:

(i) Oxidation, wherein the carbon-containing solids are placed in contact with a gaseous flow comprising oxygen, for a time period and at a temperature sufficient to allow formation of a superficial oxidized complex; and (ii) Desorption, wherein the superficial oxidized complexes generated by adsorption of oxygen in item (i) are released in a gaseous form by decomposition in the absence of $O_2$, wherein the grain size of the carbon-containing solids ranges in the interval of between about 0-1 mm, or between about 5-700 µm, or between about 50-300 µm, and wherein the duration of the oxidation step is defined according to the expressions:

$$t_o > t_{o,MIN} \quad (15)$$

$$t_o < 10^{[(9500/T_o)-8]} \quad (16)$$

where $t_o$ is expressed in s and $T_o$ is expressed in K and where $t_{o,MIN}=10$ s (seconds) for carbon-containing particles of grain size of about 200 µm, $t_{o,MIN}=1$ s for particles of 50 µm, $t_{o,MIN}=100$ s for particles of 1 mm, respectively, or $t_o$ ranging in between about 1 and 100 s, or in between 5 and 50 s, or $T_o$ equal or lower than 1800 K at a pressure of 0.1 bar, or ranging between about 600-1800K, or ranging between about 800-1600K, or between about 900-1400K.

18. The process of claim 17, wherein the duration of the desorption step is defined according to the expressions:

$$t_D < 10^{[(9500/TD)-8]} \quad (17)$$

with $T_D$ expressed in K and $t_D$ in s $$T_D < T_{D,max} \quad (18)$$

where $t_D$ ranges are in between about 1 and 150 min, or in between about 5 and 30 min with the temperature $T_D$ being defined by a temperature-programmed desorption test for the specific fuel to be treated, being $T_D$ or equal or lower than 1250K, or ranging in between about 700-1250K, or ranging in between about 800-1200K.

19. A plant for carrying out the process of claim 17 in a semi-continuous manner wherein the plant comprises a single reactor which cyclically acts both as Oxidizer and Desorber in order to prevent the mixing of the gaseous streams with which the fuel is contacted during the Oxidation and the Desorption steps.

20. A process for the combustion of carbon-containing solids with production of carbon dioxide, wherein the carbon conversion is carried out without the aid of solid oxygen carriers of the $M_yO_x$ type, with y and x being positive integer with y different from 0 and x which may also be 0 independently from each other, or of sulphate/sulphide type, said process comprising:

(i) Oxidation, wherein the carbon-containing solids are placed in contact with a gaseous flow comprising oxygen, for a time period and at a temperature sufficient to allow formation of a superficial oxidized complex; and (ii) Desorption, wherein the superficial oxidized complexes generated by adsorption of oxygen in item (i) are released in a gaseous form by decomposition in the absence of $O_2$, wherein the duration of the desorption step is defined according to the expressions:

$$t_D < 10^{[(9500/TD)-8]}, \quad (17)$$

with $T_D$ expressed in K and $t_D$ in s $$T_D < T_{D,max} \quad (18)$$

where $t_D$ ranges are in between about 1 and 150 min, or in between about 5 and 30 min with the temperature $T_D$ being defined by a temperature-programmed desorption test for the specific fuel to be treated, being $T_D$ or equal or lower than 1250K, or ranging in between about 700-1250K, or ranging in between about 800-1200K.

* * * * *